United States Patent

[11] 3,579,202

[72] Inventor: Robert M. Stewart, Encino, Calif.
[21] Appl. No. 673,252
[22] Filed Oct. 2, 1967
[45] Patented May 18, 1971
[73] Assignee Aerojet-General Corporation, El Monte, Calif.

[54] ELECTROCHEMICAL INHIBIT GATE
7 Claims, 6 Drawing Figs.

[52] U.S. Cl. .................................................. 340/173CH, 204/5, 340/172.5
[51] Int. Cl. .................................................. G11c 13/02
[50] Field of Search .......................................... 340/173; 204/5 (Cursory)

[56] References Cited
UNITED STATES PATENTS

| | | | | |
|---|---|---|---|---|
| 2,708,748 | 5/1955 | Straube | | 340/173 |
| 3,222,654 | 12/1965 | Widrow | | 340/173 |
| 3,482,217 | 12/1969 | Finney | | 340/173 |

Primary Examiner—Terrell W. Fears
Attorneys—John E. Wagner and Edward O. Ansell

ABSTRACT: An inhibit gate for data processing systems utilizing electrochemical waves of polarization as the basic signalling mechanism employing a pair of electrodes immersed in an electrolyte is disclosed. The inhibit gate employs preferably iron and gold as the active materials in an electrolyte of nitric acid. Inhibit operation is achieved by the particular composition, size and placement of two electrodes. In one form, the inhibit gate exhibits adaptive properties.

PATENTED MAY 18 1971  3,579,202
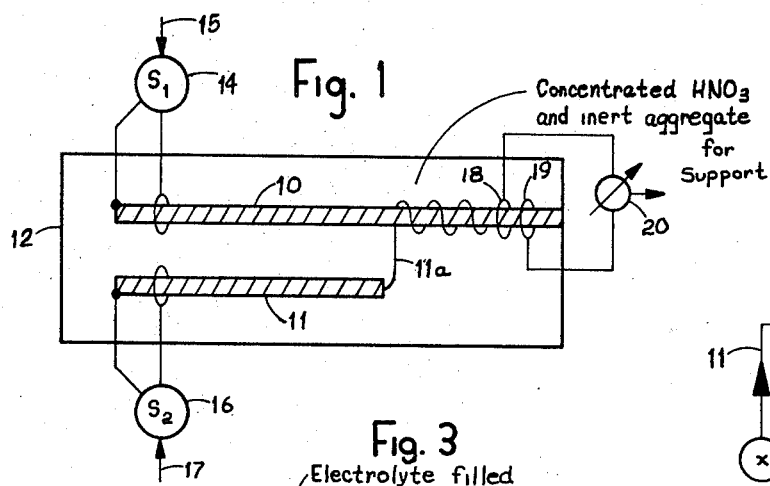
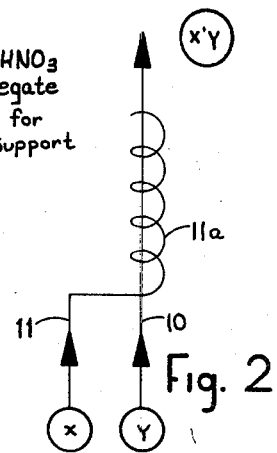
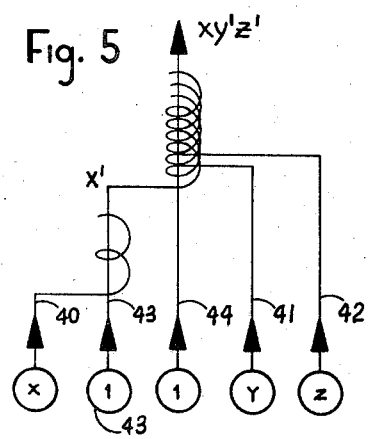
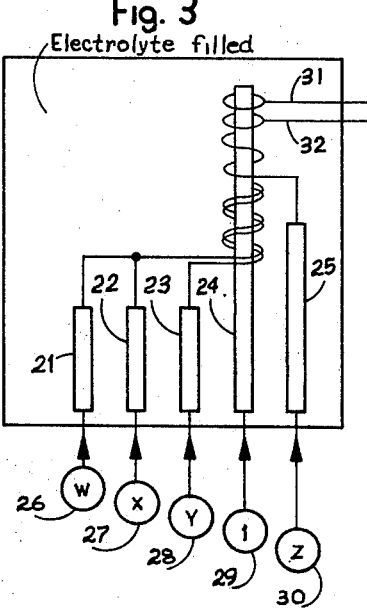
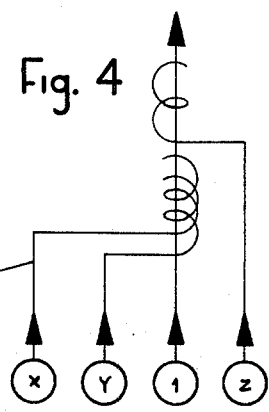
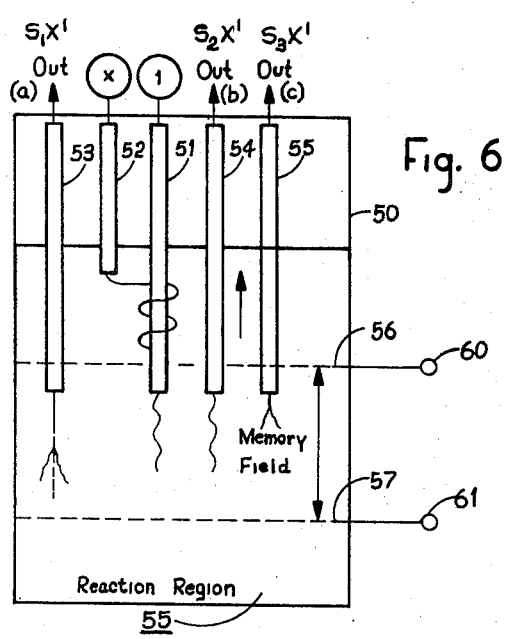
$R_1 = S_1 X'$
$R_2 = S_2 X'$
$R_3 = S_3 X'$
INVENTOR.
Robert M. Stewart
BY John E. Wagner

3,579,202

ELECTROCHEMICAL INHIBIT GATE

BACKGROUND OF THE INVENTION

This invention relates to electrochemical computers and more particularly to electrochemical inhibit gates.

In my previous U.S. Pat. No. 3,149,310, I demonstrated that in a relatively homogeneous structure of iron particles immersed in concentrated nitric acid in which we can produce complex electrochemical waves upon multielectrode stimulation, through the systematic application of electric fields across the entire structure, charge-transfer can be effected in restricted regions (those associated with recent activity) thereby making possible semipermanent reversible plastic changes in fine structure and, therefore, functioning. In my U.S. Pat. No. 3,295,112, I also illustrated how certain simple discrete logic elements may be produced in an electrochemical system and how they may be formed into a truly "field-trainable" adaptive computer. I disclosed in the latter patent a structured inhibit gate employing three dipole members in a dual chambered housing. In my copending application, Ser. No. 504,893, filed Oct. 24, 1965, and now abandoned, I illustrate a simple nondestructive readout active wave-circulation memory device, parity check and other logic elements using similar materials corresponding signals to this invention in a different physical configuration.

SUMMARY OF THE INVENTION

In the field of electrochemical computers, there is a need for a simple, logically complete discrete element which can form the basis of more complex computing systems. I have devised another form of inhibit gate employing an even simpler structure than that disclosed in U.S. Pat. No. 3,295,112 and which can be used singly or replicated to generate additional combinational functions of complete generality.

Basically, the inhibit gate of this invention involves a pair of similar rods or wires of material which exhibits the property of passivation in the presence of an electrolyte and excitation responsive to an external stimulus. The rods or wires are in generally parallel relationship with the first wire extending beyond the end of the second element. In the first structure successfully tested, the latter terminates in a helical portion of inexcitable material encircling the first wire and spaced therefrom, but, in general need only come close to the first member along a sufficiently large area.

Input-exciting connections are made with each of the rods, and the longer first one is coupled to an output device. In operation, any input pulse to the longer element is conducted to the output unless a simultaneous pulse appears at the shorter or inhibit element in classical inhibit gate operation.

In another embodiment of this invention, the longer or control electrode is coupled through parallel excitatory electrochemically adaptive portions to a separate output electrode as in U.S. Pat. No. 3,295,112.

BRIEF DESCRIPTION OF THE DRAWING

This invention is described in more detail below and is illustrated by the drawing in which:

FIG. 1 is a simplified sectional view through a single inhibit gate in accordance with this invention;

FIG. 2 is a schematic diagram of the device of FIG. 1;

FIG. 3 is a simplified sectional view of cascaded logic elements based upon the structure of FIG. 1;

FIG. 4 is a schematic diagram of the cascaded logic elements of FIG. 3;

FIG. 5 is a schematic diagram of another form of cascaded logic element employing the basic structure of FIG. 1; and FIG. 6 is a simplified showing of an adaptive computer element using the principles of this invention.

DESCRIPTION OF THE PREFERRED EMBODIMENTS

Now referring to FIG. 1, an electrochemical computer element may be seen therein which is capable of operating as an inhibit gate. It employs two active elements 10 and 11 preferably iron wires or fibers immersed in an electrolyte which fills a housing 12. The iron element 11 is shorter than element 10 and includes an inexcitable tail or dendrite 11a which encircles, but does not touch, the element 10. The elements 10 and 11 are mechanically supported in the housing 12 in spaced parallel relation by insulating chemically inert means unshown in the drawing but which may constitute inert particulate material such as particles of glass. Each element 10 and 11 is in intimate contact with the electrolyte such as 50–70 percent concentrated nitric acid which reacts with the surface of the elements 10 and 11 to form stable passivated coating but which then subsequently virtually terminates further chemical reaction between the acid and the elements until stimulated. This coating remains passive indefinitely unless disturbed by mechanical shock, local chemical reaction, intense light or heat or the application of an electrical pulse which causes a local breakdown of the passive coating. The local region of chemical activity between the iron and nitric acid upon the application of "such stimuli" is progressively transmitted along the length of the element 10 as a local active region. This local region or pulse may be observed visually and also detected by the resultant transient change in local electric field which usually results in about 0.7 v. change in potential difference across the surface. A pair of spaced probes 18 and 19 connected to a meter 20 for detecting such field changes constitutes a typical output device of a system using the inhibit gate. For purposes of illustration, the triggering source for element 10 is illustrated as an electrical pulse source 14, triggered externally over lead 15 and applying the pulse across the passivated film on the surface of element 10. The electrochemical reaction described briefly above is explained in more detail in my U.S. Pat. No. 3,149,310 which should be reviewed if more adequate understanding of the phenomenon is required. Suffice it to say that a detectable pulse may be transmitted with some characteristic delay by electrochemical reaction from an input to an output region.

I have now discovered that such pulse transmission along such a linear member may be controllably suppressed by means of an adjacent "excitable" dipole in the region of the inexcitable but conductive member. For this reason, the second electrode 11 of excitable material such as iron includes a tail 11a of inexcitable material such as gold or silver. The tail 11a encircles the element 10 between its input region at the left and output region at the right to be in proximity to the path of pulse transmission along element 10. Element 11 has an associated input pulse generator 16 which is triggered by remote source denoted by arrow 17 comparable to the lead 15 of element 10. In the absence of any pulse on element 11, the passage of pulses from input to output of element 10 is not impeded. However, a pulse on the element 11 from a pulse generator 16 reaching the tail portion 11a produces an electric field and circulation of current which suppresses and obliterates any pulse traveling through the encircled inhibition region of element 10.

A schematic diagram of the device is shown in FIG. 2. The primary or direct input signal source is identified by the encircled $y$ and the direct signal path between the input source $y$ and output by the arrow heads on the element 10. The inhibit element 11 responds to the $x$-input signal to the gate and is coupled to the element 10 to inhibit pulse transmission between the input and output ends of element 10.

The device of FIGS. 1 and 2 therefore exhibits both signal conduction and inhibition or produces in the script of Boolean algebra the function:

$R = x'y$, or the device responds with input and $y$ and not $x$, where R denotes response of the output detector or meter 20, $x'$ denotes the logical inverse or complement of an input signal from pulse generator 16, and $y$ denotes an input signal from source 14 to element 10.

A variation on the operation of the basic inhibit gate of FIGS. 1 and 2 may be produced by:
1. the addition of additional inhibit inputs;
2. the substitution of a source of constant excitation for the pulse source 14 of FIG. 1 to provide a simple invertor or complementation device;
3. additional inputs and constant excitation to give generalized "Peirce function" or "NOR gate" as in FIGS. 3 and 4;
4. to provide variable or adaptive coupling;
5. cascaded elements to perform more complex functions.

Examples of logic devices incorporating multiple inhibit inputs (1) and sources of constant excitation (2) are shown in FIGS. 3, 4 and 5. FIG. 3, similar to FIG. 1, shows a simplified structural embodiment of an NOR gate with a number of excitable elements 21–25 each with a respective input signal source 26–30. The element 24 constitutes the signal-conductive path comparable to the element 10 of FIG. 1, and elements 21, 22, 23 and 25 are multiple-inhibit inputs. The signal sources for elements 26–28 and 30 are represented by the letter designations $w$, $x$, $y$ and $z$ to facilitate the development of the operational equation of the device. The signal source 29 of this embodiment is a free-running pulse generator represented by the numeral "1" to indicate that it produces a constant operating signal input to the device, and in the absence of any inhibiting input, produces one-to-one concurrence of output pulses. The output pulses are detected by probes 31 and 32 connected to utilization device 33 similar to the detector 20 of FIG. 1. The chamber, of course, enclosed an electrolyte which establishes the passivated condition on the active elements and allows the excitation and signal conduction phenomena to occur.

A schematic of the device of FIG. 3 is shown in FIG. 4 and as can be seen, rather closely represents it in physical, as well as functional, configuration. As so constructed, the device exhibits the property of:

$$R = w'x'y0.z'$$

or in other words, a generalized Peirce function or NOR gate. Devices of this type may be replicated in a plurality of layers as exemplified schematically in FIG. 5 illustrating a two-layer system. It includes three inhibit inputs 40, 41 and 42 driven by sources $x$, $y$ and $z$ respectively and two constantly excited inputs 43 and 44 driven by excitory sources $1_0$ and $1_1$ respectively. The input 43, although excitory, is coupled as an inhibitory input to the element 44. The $x$-input 40 serves to temporarily disable the inhibit input 43. The inhibit inputs $y$ and $z$ operate in the same manner as the inhibit element in FIGS. 1 and 3 with the net result that the device of FIG. 5 exhibits the property:

$$R = (x')'y'z'$$

or $$R = xy'z'$$

It is apparent from these embodiments that through multiple layers, it is possible to realize any minterm of input variables, i.e., a device which responds to one and only one specific input pattern.

Conditionable coupling or conditioned response may be accomplished in accordance with this invention employing the embodiment of FIG. 6. It includes a housing 50 enclosing an input electrode 51, an inhibit electrode 52 and a number of output electrodes 53, 54 and 55. There are three significant differences in this embodiment from the previously described devices. First, there are multiple output elements, each having a grown extension or dendrite extending into a lower reaction region. This region is embraced by a pair of field electrodes 56 and 57 having external terminals 60 and 61 through which a field potential may be applied to the reaction region. The housing 50 is filled with an electrolyte such as concentrated nitric acid producing the primary reaction and, in addition, a soluble salt of a metal from which metallic ions may be deposited so as to increase the size of the dendritic growths (or, by current reversal, decrease). The technique of adaptive training of electrochemical computing elements of this type is taught in my previous U.S. Pat. No. 3,149,310, but briefly it utilizes the phenomenon that the iron surface impedance of an element drops by a factor of at least 400 during and for a short period after excitation. Therefore, an electric field applied across the electrodes 56 and 57 after firing of electrode 51 and response of one or more of the output electrodes 53, 54 or 55 will increase primarily (or decrease depending upon field polarity) the size of the dendrite structure of recently fired electrodes by electrodeposition or depletion, thereby changing the coupling to the response member. For example, the normal response of the assembly of FIG. 6 is:

$$R = x'$$

indicating that one or more of the responder or output electrodes 53, 54, or 55 will produce an output pulse in the absence of a pulse on the $x$ inhibit electrode 52.

If the response occuring is unwanted, the application of a field potential across the field electrodes 56 and 57 will result in partial depletion of the recently fired responder elements while leaving the remaining unfired responders virtually unaffected. The process of field conditioning comprises the steps of (1) applying an input pulse and monitoring the output; (2) if change desired, repeat with immediate application of field "shock;" (3) reapply input to check for properly changed response. Repeat (2) and (3) until the desired response is achieved. With the addition of field trainable response, the operation of the assembly of FIG. 6 may be characterized as:

$$R_1 =_{s_1} x'$$

$$R_2 =_{s_2} x'$$

$$R_3 =_{s_3} x'$$

where $s_1$, $s_2$, $s_3$ are the effectively binary (0, 1) states of coupling of the signal source (inverted) to each of the output members.

It is apparent that each of the logic assemblies described above may operate as single logic devices; however, their prime advantages are achieved when replicated into multilevel or pyramidal assemblies to provide a single binary response to complex input functions. An example of a requirement for such response is in pattern recognition systems.

I claim:
1. An electrochemical gate, comprising:
    a plurality of electrodes;
    an electrolyte in which said electrodes are immersed and reactive with said electrodes to form on each of their surfaces a passive film;
    a plurality of energizers for said electrodes to cause breakdowns at specific areas in their films which breakdowns travel along their surfaces;
    a plurality of detectors to sense the breakdowns at other specific areas of said electrodes;
    coupler means for the output of at least one said detector to at least one other said electrode;
    synchronizer means for said energizers; and
    means to interconnect said couplers and synchronizers so that a signal representing a desired excitation combination thereof is provided at the output of at least one said detector.
2. The gate of claim 1 wherein each said coupler is effective at areas of each said electrode other than the specific areas affected by each said energizer.
3. The gate of claim 1 wherein each said detector and coupler comprises an extension attached to said electrode and nonreactive with said electrolyte.
4. The gate of claim 1 wherein each said coupler comprises a winding around said electrode, but out of physical contact therewith.

5. The gate of claim 1 wherein said interconnections provide a signal representing an inhibit function.

6. The gate of claim 1 wherein said interconnections provide a signal representing a NOR function.

7. The gate of claim 3 wherein each said electrode is of iron, said electrolyte is nitric acid and each said detector and coupler is of noble metal.